(No Model.)

W. H. O'CONNOR.
BAND PULLEY.

No. 319,993. Patented June 16, 1885.

WITNESSES

C. W. Dashiell.
E. G. Siggers.

INVENTOR
Wm. H. O'Connor.
By, C. A. Brown
Attorneys

N. PETERS, Photo-Lithographer, Washington, D. C.

UNITED STATES PATENT OFFICE.

WILLIAM HENRY O'CONNOR, OF SOUTH CHICAGO, ILLINOIS.

BAND-PULLEY.

SPECIFICATION forming part of Letters Patent No. 319,993, dated June 16, 1885.

Application filed April 1, 1885. (No model.)

*To all whom it may concern:*

Be it known that I, WILLIAM H. O'CONNOR, a citizen of the United States, residing at South Chicago, in the county of Cook and State of Illinois, have invented a new and useful Improvement in Band-Pulleys, of which the following is a specification, reference being had to the accompanying drawings.

My invention relates to a band-pulley, and more particularly to that class known as "sectional pulleys," which are adapted to be applied to shafts without removing the same, the object being to provide an improved form of clamp.

A further object of the invention is to provide a clamp which shall be cheap and simple in its construction, readily and easily applied, and one that will be strong and durable.

With these ends in view the invention consists in the improved construction and combinations of parts hereinafter fully described, and pointed out in the claims.

Figure 1:
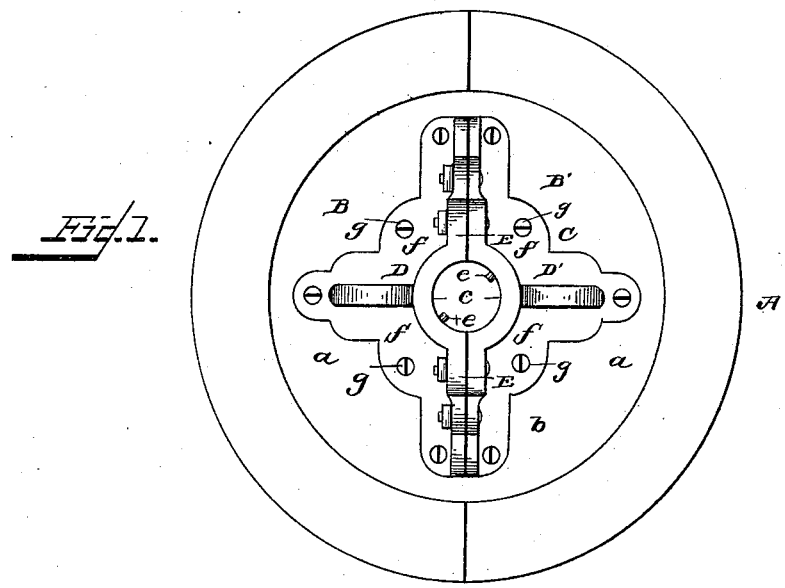
Figure 2:
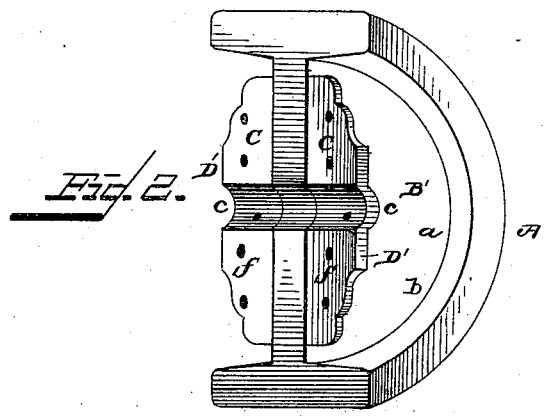
Figure 3:
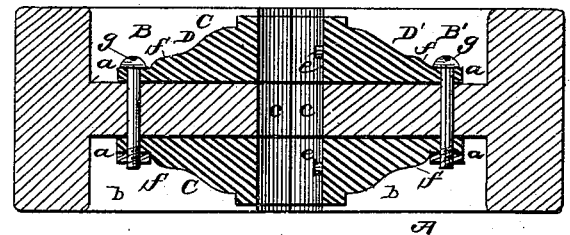

In the drawings, Figure 1 is a perspective view of a band-pulley constructed in accordance with my invention. Fig. 2 is a perspective view of the inner side of one of the sections. Fig. 3 is a horizontal section of Fig. 1.

In the accompanying drawings, in which like letters of reference indicate corresponding parts in all the figures, A represents the pulley, which is composed of two sections, B B'. These sections B B' are provided with recesses $a$ on their outer sides, so that when the sections are clamped together a circular depression, $b$, is formed on each side of the pulley. Said sections are also formed on their inner sides with recesses $c$, which, when the sections are clamped together, form an opening for the passage of the shaft, upon which the pulley is located.

C C represent the clamps which are placed upon each side of the pulley, and which connect and securely hold the sections of the same together. Each of the clamps C is composed of two sections, D D', provided with recesses $c$, which, when the sections are secured together, form a passage for the shaft. Communicating with the said passage are set-screws $e$, whereby the pulley is held from slipping upon the shaft when the same is revolved. Each section is provided with outwardly-extending flanges $f$, provided with holes or openings, in which are located bolts $g$, for clamping and holding the sections together, and at the inner ends of the sections are provided outwardly-extending wings E, having holes or openings for the passage of bolts, whereby the clamps C C, on opposite sides of the pulley, are clamped together.

In applying the pulley the clamp-sections are secured to the pulley-sections and the same placed upon the shaft at the desired point. Bolts are then passed through the openings in the flanges of the clamp-sections and nuts fitted on the ends of the bolts, thus holding the sections firmly and securely together. The set-screws are then tightened and bite the shaft, thus holding the pulley from slipping upon the shaft.

The above-described pulley is simple in its construction, may be applied without removing the shaft from its bearings, is strong and durable, and cheap to manufacture.

The pulley before described may be of paper, wood, metal, or other material adapted for the purpose for which the pulley is intended.

Having fully described my invention, what I claim as new, and desire to secure by Letters Patent, is—

1. A pulley composed of sections and sectional clamps secured to and connecting said sections, substantially as set forth.

2. A pulley composed of sections and sectional clamps secured to and connecting said sections, and set-screws working in openings in the clamps for holding the pulley rigidly upon the shaft, as set forth.

3. A pulley composed of two sections, clamps secured to each side of said pulley, each of said clamps comprising two sections having outwardly-extending flanges, and wings and bolts connecting said flanges, as set forth.

In testimony that I claim the foregoing as my own I have hereto affixed my signature in presence of two witnesses.

WILLIAM HENRY O'CONNOR.

Witnesses:
FRANK MAYO,
FRANCIS MAYO.